Jan. 6, 1970 L. W. SMITH 3,488,443
MULTIPLE MESSAGE ANNOUNCING MACHINE WITH DIFFERENT MESSAGE RECYCLING TIMES
Filed Oct. 5, 1966 5 Sheets-Sheet 1

INVENTOR,
LEARY W. SMITH
BY Watson, Cole, Grindle & Watson
ATTORNEYS

INVENTOR
LEARY W. SMITH

BY Watson, Cole, Grindle & Watson
ATTORNEYS

Jan. 6, 1970 L. W. SMITH 3,488,443

MULTIPLE MESSAGE ANNOUNCING MACHINE WITH DIFFERENT MESSAGE RECYCLING TIMES

Filed Oct. 5, 1966 5 Sheets-Sheet 3

INVENTOR
LEARY W. SMITH

BY Watson, Cole, Grindle & Watson
ATTORNEYS

INVENTOR
LEARY W. SMITH

BY Watson, Cole, Grindle & Watson
ATTORNEYS

INVENTOR
LEARY W. SMITH

BY Watson, Cole, Grindle & Watson
ATTORNEYS

United States Patent Office 3,488,443

Patented Jan. 6, 1970

3,488,443

MULTIPLE MESSAGE ANNOUNCING MACHINE WITH DIFFERENT MESSAGE RECYCLING TIMES

Leary W. Smith, Atlanta, Ga., assignor to The Audichron Company, Atlanta, Ga., a corporation of Georgia Filed Oct. 5, 1966, Ser. No. 584,475
Int. Cl. H04m *11/00;* G11b *5/00*
U.S. Cl. 179—6 9 Claims

ABSTRACT OF THE DISCLOSURE

A multiple message announcing system comprising a continuously rotating drum having a magnetic surface thereon and a multiplicity of interleaved tracks having messages, each of the messages having a different recycling time, a plurality of interconnected heads each associated with a respective one of the tracks for reproducing messages on each of the tracks independent of each other, means for moving the heads as a unit simultaneously along the drum surface to reproduce the messages independent of each other, means for returning the heads to the beginning of the tracks for repetitively recycling the heads along the tracks, and switching means selectively connecting external lines to selected ones of the heads for predetermined time periods including at least the length of a message recorded on one of the tracks.

Figure 1A:
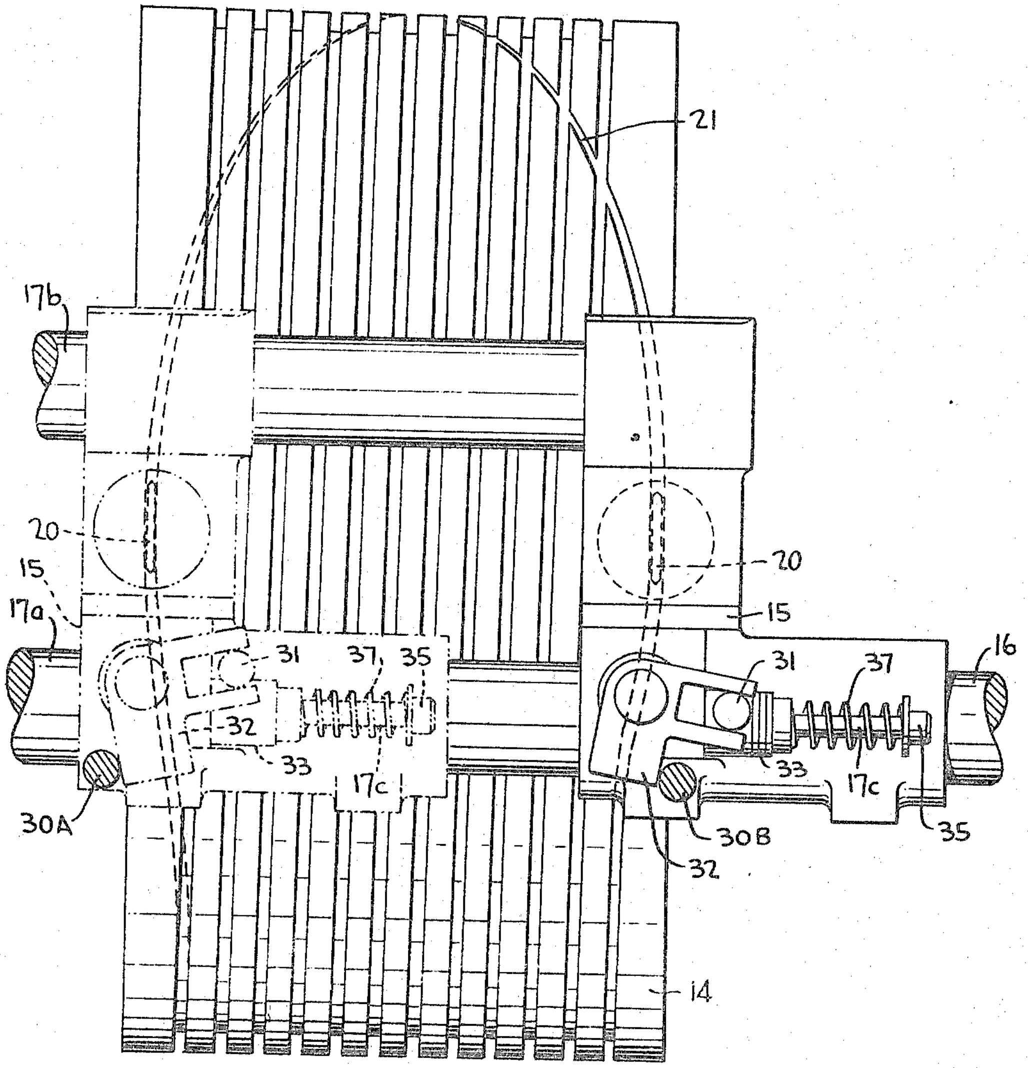

This invention relates to message announcing machines and, more particularly, the magnetic drum type announcing machines for announcing pre-recorded messages on demand of an interrogation signal from associated equipment such as telephone central office trunks.

Previously several types of machines have been employed in the announcement of pre-recorded messages. These have been machines which were adapted to one or the other of two different announcement conditions or classifications.

One classification has been machines of fixed cycle length having one or more sound heads reproducing one or more messages of a fixed length. A disadvantage of this type machine is that it is limited to announcing a message or messages which must be close to the length for which the machine was designed in order to hold the idle time between messages to an acceptable minimum. Messages shorter than design length result in correspondingly longer idle times between messages, with subsequently longer idle time of expensive associated equipment. The advantage of this type machine is that it is relatively simple in design and multiple announcements can be reproduced simultaneously.

Another classification of announcing machines has been one of variable cycle length capable of reproducing one announcement only. This type of machine has one sound head and one sound track and through suitable controls, the machine is caused to recycle at the end of the announcement. The disadvantage of this type machine is that it is a relatively complex design and thus expensive to manufacture and maintain, and is limited to reproducing one announcement only. The advantage of this type machine is that any length of announcement may be reproduced within the limits of the maximum recycle time of the machine.

It is therefore an object of this invention to provide an announcing machine which incorporates the advantages of both the forementioned classifications of machines in that multiple announcements of either fixed or variable length within the capabilities of the machine can be reproduced from the one machine, with none of the inherent disadvantages of the previously mentioned types of machines.

It is a further object of this invention to provide a machine for reproducing multiple variable length announcements, wherein the length of any announcement being reproduced is either contingent on nor limited by any characteristic of other announcements being reproduced.

It is another object of this invention to provide a machine which will reproduce multiple variable length announcements simultaneously with a minimum of idle time between announcements.

Therefore, in accordance with this invention an announcing machine system is provided wherein a multiplicity of interleaved tracks on a single continuously rotating magnetic drum having messages each of which have a different recycling time so as to be selected independently at the start of each separate message and dropped at the end of the message without interposition of waiting periods related to the length of messages on other tracks. A carriage assembly is provided with multiple sound heads scanning offset tracks on a spiral path and with accelerated recycling of the carriage assembly at the end of the announcement cycle. The heads are lifted from the track on return and are set to let down on an unrecorded portion of the drum for the next cycle to prevent interference with recorded sound tracks, Electronic circuitry provides for proper entry and reproduction of the audio messages recorded on the various tracks.

Figure 1:
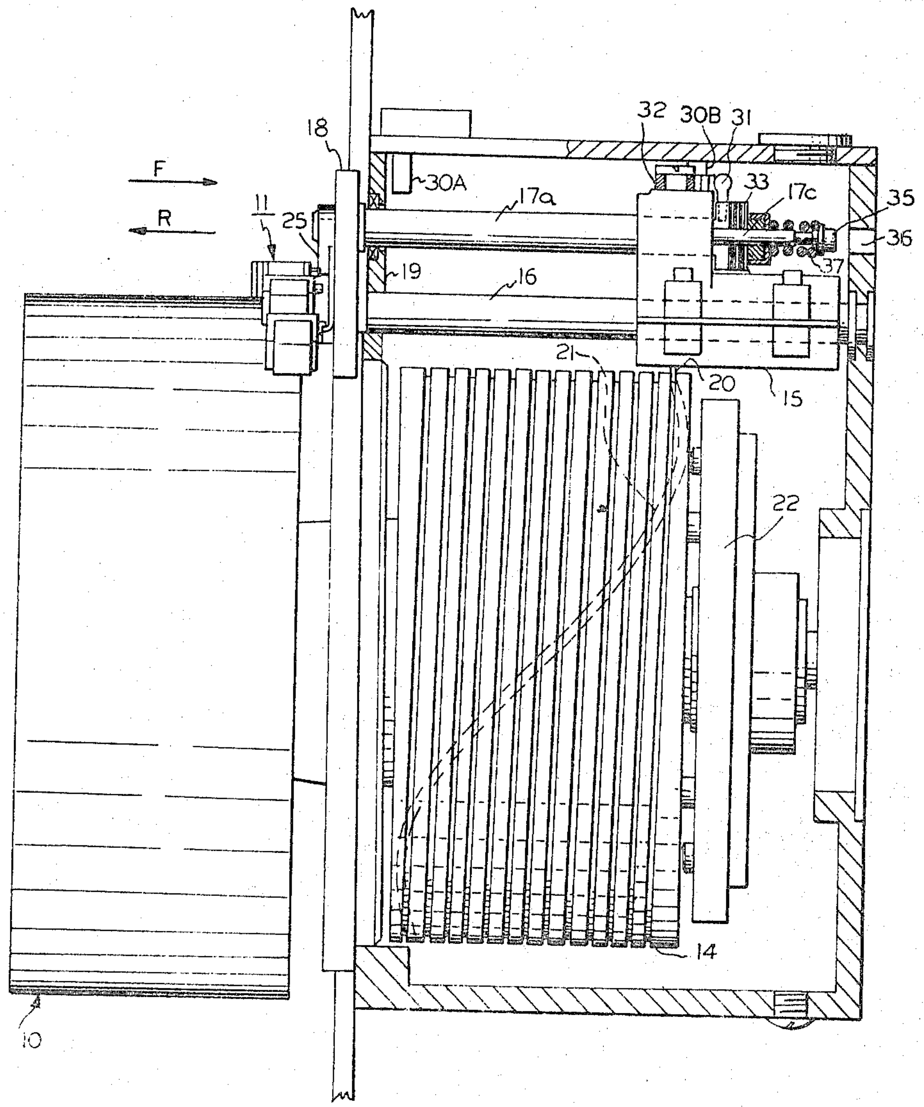
Figure 2:
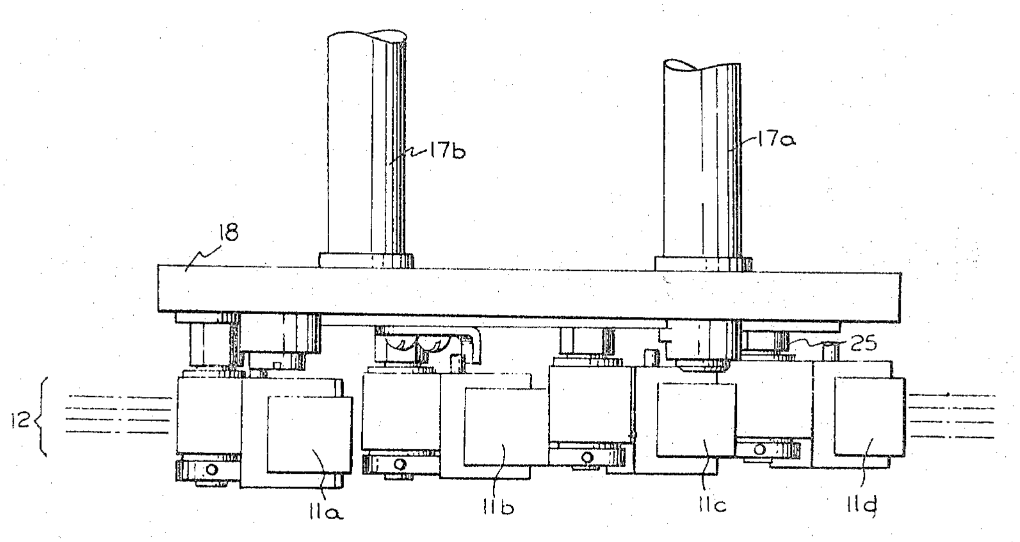
Figure 3:
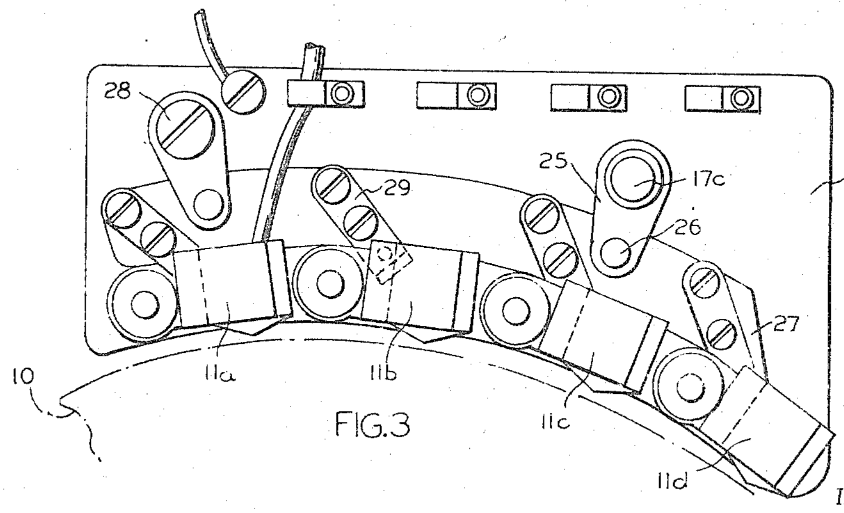
Figure 4:
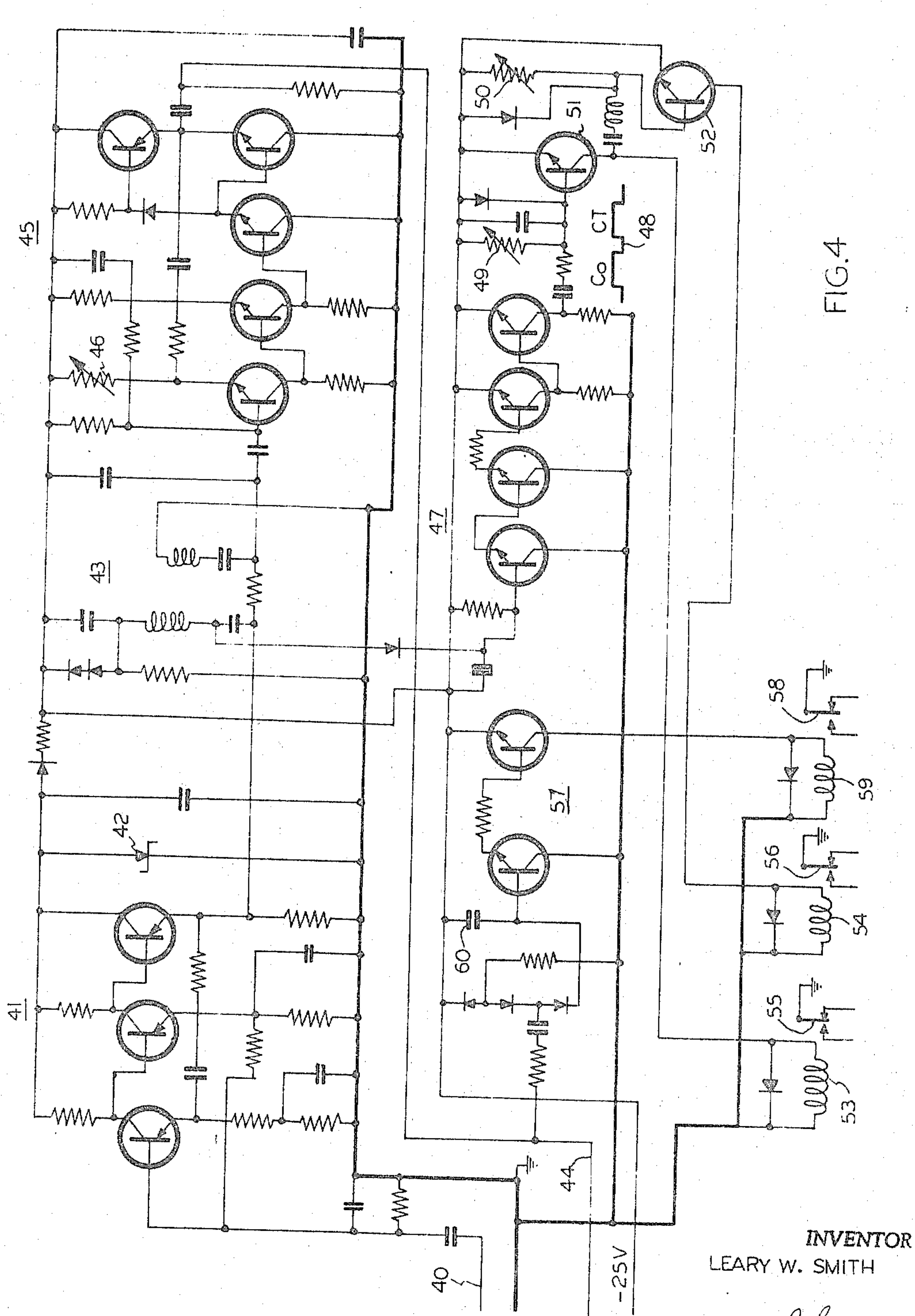
Figure 5:
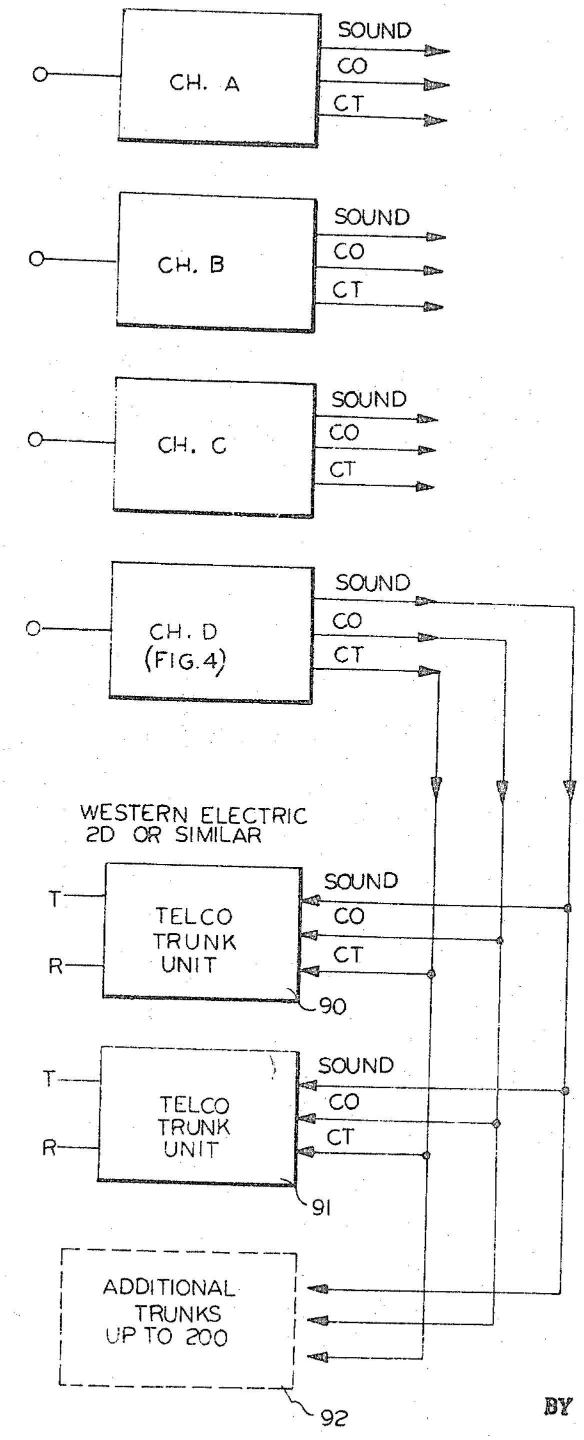

A specific detailed embodiment of the invention together with further features and objects are described in the following specification with reference to the accompanying drawings, wherein:

FIGURE 1 is a side view, partially in section of a magnetic mechanism assembly provided by the invention, FIGURE 1*a* is a slightly enlarged top perspective view of FIGURE 1 showing only the carriage in relation to the rotating cam groove member, the carriage being shown in phantom at the start of its forward motion, FIGURES 2 and 3 are respectively top and side views of a magnetic head assembly used in accordance with the invention, FIGURE 4 is a schematic circuit diagram of an electronic audio-control circuit afforded by the invention, and FIGURE 5 is a simplified block circuit diagram of an electronic telephone switching system incorporating the improved recording device afforded by this invention.

The mechanical aspects of the invention are shown in FIGURES 1–3, which show a drum 10 having a magnetic recording surface thereon with a set of magnetic heads 11 movable thereon to read audio messages and the corresponding mechanical control features therefor. Basically, a multiple group of interconnected heads 11 associated, respectively, with each of a set of tracks 12 are moved as a unit over a spiral path on the magnetic drum surface as directed by a cammed drum groove member 14 operatively engaging a carriage assembly 15, which assembly moves back and forth upon a pair of shafts 16 (only one being shown) to push the head assembly frame 18 back and forth through the use of a corresponding pair of shafts 17A and B extending through frame member 19. The grooved cam member 14 is operatively engaged by a cam follower 20 to provide forward motion (as indicated by the arrow F) typically during about 60 seconds with about 1.6 seconds used for return by fast return cam groove 21, while the drum typically rotates at a constant speed of about 12 r.p.m. through a worm gear motor drive (not shown) coupled in the rear to worm gear 22.

As can be seen more clearly in FIGURE 1*a*, the quick return groove 21 smoothly interconnects the foremost ones of the forward grooves on the member 14 so as to traverse or intersect each of the intermediate grooves. At the end of its forward travel, seen in FIG. 1 and at the right of the member 14 in FIG. 1*a*, the cam follower 20 will enter the return groove 21 so that, as the member 14 continues to rotate in the same direction, the cam follower and its attached assembly 15 will be moved rearwardly in the direction of the arrow R until it reaches the rearmost groove of the member 14. Here, the cam follower will then reenter the rearmost spiral groove and again be moved toward a forward direction of travel.

It should be noted that the cam follower 20 is shown only in end elevation in FIG. 1. However, in order for the cam follower to smoothly traverse the intermediate forward grooves, it must necessarily be of a slightly elongated flat design as clearly shown in FIG. 1*a* of the drawings.

Each of the four exemplary heads 11A, 11B, 11C, and 11D is spaced to provide guard bands between four corresponding tracks 12 with the cam groove member 14 being cut to spiral the group of tracks along the surface of the drum 10 over twelve revolutions occupying about one minute of recording time. The fast return groove 21 thus will occupy less than half the circumference to produce a fast return motion of the head carriage in about 1.6 seconds.

This mechanism provides for long record life without significant wear by use of magnetic heads floated on a film of lubricant applied to the record drum surface of the drum 10. The magnetic heads must be raised out of contact with the recorded surface of drum 10 during the return portion of the carriage cycle to avoid pickup of grabled sound from the record. Accordingly, a head lift mechanism is provided. Thus, shaft 17A has a lever arm 25 mounted on and pivoted by interior shaft 17C and in frame member 18 and pinned at 26 to the movable head lifter assembly framework 27. Another pivot point for the head lifter assembly is at screw 28 in frame 18, and thus as pivot arm 25 is made to rotate clockwise to the left as shown in FIGURE 3, the interconnected heads will be lifted by brackets 29 contacting pins in the individual head assemblies and lifting them out of contact with the recorded surface on drum 10.

The heads are lifted at the end of their forward travel of FIG. 1 and are thereafter dropped onto the surface of drum 10 after they are returned to overlie the starting position of the drum. For this purpose, adjustable stops 30A, 30B are mounted to the underside of the assembly, as seen in FIG. 1, at a position so as to overlie the forward and rearward edges, respectively, of the drum 10 (see FIG. 1*a*). A cam lever or head lifter lever 32, of a generally right angle shape, is pivotably mounted to the top of carriage 15. One leg of lever 32 is bifurcated (see FIG. 1*a*) so as to snugly engage opposite sides of a pin member 31 mounted on interior shaft 17C. Opposite sides of the other leg or lever 32 are brought into contact with stops 30A, 30B, respectively, at the beginning and end of the forward travel of the carriage. As the pin 31 is pivoted from its position as shown in solid to its position as shown in phantom, in FIG. 1*a*, and back again, the interior shaft 17*c* is caused to be axially rotated. A friction clutch 33 is also mounted on shaft 17*c* for effecting a tight axial rotation of the interior shaft.

Tension on the friction clutch 33 may be adjusted by means of screw 35 reached through access hole 36 which permits the tightening or loosening of spring 37 pressing against the plates of clutch 33.

In the assembly framework 27 are adjustable brackets 29 for each head which permit their relative individual adjustment with respect to the recording surface.

At the commencement of reproduction of the recorded messages, it can be seen that the heads 11*a–d* are in contact with the surface of drum 10 when the carriage assembly 15 is in its position, as shown in phantom in FIG. 1*a*, at the beginning of the carriage forward travel. At the commencement of the simultaneous rotation of interconnected drum 10 and member 14, the carriage 15 progresses in the forward direction of arrow F as it slides along the horizontally spaced shafts 16. Such a linear movement of the carriage is effected by means of the forward grooves on the cylindrical surface of member 14 which serve to push the attached cam follower 20 in a forward direction during its sliding engagement with the forward grooves. As the cam follower reaches the end one of the forward grooves, as shown in FIG. 1, it begins to enter the quick return groove 21, as shown in FIG. 1*a* at the right of member 14. While the cam follower is commencing entry of the groove 21, one side of one of the lever 32 legs is brought into contact with the stop member 30B. Because the return groove 21 lies further forward in relation to the end one of the forward grooves, as shown in FIG. 1*a*, further forward movement of the carriage causes the lever 32 to rotate clockwise against pin 30B thereby pivoting pin 31 downwardly so as to cause axial rotation of shaft 17*c* in a counterclockwise direction. Accordingly, the head lifter assembly 27 will be moved away from the surface of drum 10 thereby lifting the heads 11A through 11D. Continued rotation of member 14 in the same direction permits a quick return of the carriage toward a reverse direction (as indicated by the arrow R) as the cam follower is moved reversely during sliding engagement with the return groove 21. Since the heads 11A–D are not in contact with the surface of drum 10 during return movement, pickup of garbled sound therefrom is substantially avoided. When the cam follower reaches the first of the forward grooves, the carriage will be in a position as shown in phantom in FIG. 1*a*. Here, one side of one of the lever 32 legs will contact pin 30A whereby the lever 32 will rotate counterclockwise thereby pivoting pin 31 upwardly so as to cause axial rotation of shaft 17*c* in a clockwise direction. Accordingly, the head lifter assembly 27 will be moved toward the surface of drum 10 thereby lowering the heads 11A through 11B. The heads are preferably lowered on the drum surface at a position off the end of the recorded message track. In this position, a recycling for reproduction of the recorded messages is commenced.

Each of the heads has a separate access control and amplifier circuit of the nature shown in FIGURE 4. Audio from the sound heads is coupled at input lead 40 and ground for pre-amplification in transistor amplifier section 41 operating at a twelve volt level established by Zener diode 42 from the −25 volt power input level. The amplified audio output signal is produced at lead 44 by way of power amplifier section 45 controlled by volume adjustment 46.

Section 43 comprises a 4500 cycle filter which serves to detect a tone signal of several cycles duration placed at the end of each message. This tone signal is processed in pulse amplifier 47 and provides for pulse form shaping into a signal 48 which has adjustments 49 and 50 respectively for the two signal sections $C_o$ (cut off previous access lines) and $C_t$ (connect new access lines) of the waveform; which appears as a changing D-C level with the audio carrier filtered out. These signals by way of respective amplifiers 51, 52 and relays 53, 54 provide control signals at contact sets 55, 56.

A further audio alarm or voice output detection signal is derived in amplifier 57 for operation of contact set 58 of relay 59. Relay 59 is normally operated and releases after voice failure within 20 seconds when the stored charge in 60 is used up in the input of amplifier 57.

The system can be operated to either barge-in in one mode of operation or to automatically connect at the start and end of each message in another operational mode, as by any of the well-known marker signal techniques, without further or complicated access controls, and conventional switching techniques may be used to connect the recorder to multiple telephone lines for each message cycle. In the case of short messages (10 seconds), multipile recordings (6) are made serially on one channel while intermediate messages (30 seconds) have only two recordings and long messages (30 to 60 seconds) provide a single message. However, with each amplifier channel independent as shown in FIGURE 4, access to short messages need not be delayed to coincide with the longest messages while tying up the connected telephone lines.

The system connections may be made as shown in FIGURE 5, where each channel A, B, C, or D may be used to independently connect various standard telephone company trunk units 90, 91, 92. These trunk units may be, for example, those Bell Telephone units known as No. 2–D announcement systems identified in circuit description CD–96496–01 with accompanying drawings, which serve to give subscribers access to automatic announcement machines through central office switching equipment coupled by the T (tip) and R (ring) lines to the trunk units 90, etc.

It may be seen from the foregoing description that there is provided an improved and novel multiple message announcing system with features of novelty believed representative of the nature and the scope of the invention defined with particularity in the appended claims.

What is claimed is:

1. A multiple message announcing system comprising in combination, a continuously rotating drum having a magnetic surface thereon and a multiplicity of interleaved tracks having messages, each of the messages having a different recycling time a plurality of interconnected heads each associated with a respective one of said tracks for reproducing messages on each of said tracks independent of each other, means to move said heads as a unit simultaneously along said surface to reproduce the messages independent of each other, means to return said heads to the beginning of said tracks for repetitively recycling the heads along said tracks, and switching means selectively connecting external lines to selected ones of said heads for predetermined time periods including at least the length of a message recorded on one of said tracks.

2. A system as defined in claim 1, wherein the switching means connects the external lines at the beginning of a recorded message and disconnects at the end of a recorded message.

3. A system as defined in claim 1 wherein the switching means connects external lines to one of said messages upon demand and disconnects the lines after completion of at least one complete message.

4. A system as defined in claim 1 having tones recorded at the end of each message and a control circuit for each track providing from said tones a sequence of signals for connecting and disconnecting access lines.

5. A system as defined in claim 4 additionally producing a control signal derived from the presence of audio on each of said tracks.

6. A system as defined in claim 4 wherein said means moving said heads comprises a carriage assembly connected to said heads, a cylindrical cam member having a common rotational axis with said drum and being mounted for rotation therewith, said cam member having a plurality of forward grooves along its cylindrical surface and said cam member also having a quick return groove along its cylindrical surface, and said moving means further comprising a cam follower mounted on said carriage assembly and engaging said forward grooves for moving said heads in a forward direction, said cam follower engaging said quick return groove at the end of said forward direction for returning said heads for a repeated forward direction of movement.

7. A system as defined in claim 6 including a mechanism for raising said heads from said magnetic surface during the quick return wherein the connection between said heads and said carriage assembly comprises a pivotable shaft having its longitudinal axis lying parallel to said rotational axis, a friction clutch mounted on said shaft, a pin member mounted on said shaft, a cam lever mounted on said carriage assembly and in engagement with said pin member, and a cam stop mounted in the path of said cam lever at the beginning and at the end of said forward direction of movement, one of said cam stops causing said cam lever to be rotated in one direction upon contact therewith for raising said heads as said shaft is pivoted upon movement of said pin member in said one direction, the other of said cam stops causing said cam lever to be rotated in another direction upon contact therewith for lowering said heads as said shaft is pivoted upon movement of said pin member in said another direction.

8. A system as defined in claim 7, wherein the messages recorded in said tracks have a starting position on said record surface along the tracks from the position at which the heads are returned.

9. A system as defined in claim 1 wherein the plurality of heads are mounted on a framework, with individually adjustable brackets which are selectively adjustable toward and away from said magnetic surface.

References Cited

UNITED STATES PATENTS

| | | | |
|---|---|---|---|
| 2,011,216 | 8/1935 | Franklin | 179—6 |
| 2,862,065 | 11/1958 | Franklin | 179—100.2 |
| 2,137,157 | 11/1938 | Crudo et al. | 179—100.3 |
| 2,864,895 | 12/1958 | Bryant | 179—6 X |
| 2,920,147 | 1/1960 | Sellers et al. | 179—6 X |
| 3,075,775 | 1/1963 | Druz | 179—100.2 X |
| 3,300,591 | 1/1967 | Gushue et al. | 179—100.3 |

BERNARD KONICK, Primary Examiner

RAYMOND F. CARDILLO, Jr., Assistant Examiner

U.S. Cl. X.R.

179—100.2